(12) United States Patent
Vodermayer

(10) Patent No.: US 6,482,507 B2
(45) Date of Patent: Nov. 19, 2002

(54) FIBER COMPOUND MATERIAL

(75) Inventor: Albert Maria Vodermayer, Dietlikon (CH)

(73) Assignee: Suizer Markets and Technology AG, Winterthur (CH)

( * ) Notice: Subject to any disclaimer, the term of this patent is extended or adjusted under 35 U.S.C. 154(b) by 0 days.

(21) Appl. No.: 09/828,071

(22) Filed: Apr. 6, 2001

(65) Prior Publication Data

US 2001/0028947 A1 Oct. 11, 2001

(30) Foreign Application Priority Data

Apr. 6, 2000 (EP) ............................................ 00810301

(51) Int. Cl.$^7$ .............................................. B32B 15/04
(52) U.S. Cl. ................................ 428/293.1; 428/294.7; 428/317.1; 428/327; 428/343; 428/375; 428/361; 428/346; 428/356; 428/399
(58) Field of Search ............................ 428/292.1, 341, 428/355 R, 364, 378, 293.1, 294.7, 317.1, 327, 343, 375, 360, 361, 346, 356, 399

(56) References Cited

FOREIGN PATENT DOCUMENTS

| CA | 2076736 | 3/1993 | |
| EP | 54120693 | * | 9/1979 |
| FR | 2655036 | | 5/1991 |

OTHER PUBLICATIONS

Patent Abstracts of Japan, vol. 003, No. 142 (C–065), Nov. 24, 1979 & JP 54 120693 A (Mitsui Petrochem Ind Ltd), Sep. 19, 1979, Abstract.

* cited by examiner

*Primary Examiner*—Merrick Dixon
(74) *Attorney, Agent, or Firm*—William Michael Hynes; Townsend and Townsend and Crew, LLP

(57) ABSTRACT

The fiber compound material contains at least one fiber component and at least two matrix components of different material classes which have different thermo-mechanical properties. In a manufacture of the compound material two matrix components can be liquefied and fiber filaments of the fiber component can be wetted by the liquefied matrix components. In this in the liquefied state the one matrix component is not soluble in the other. In a consolidation of the compound material one of the previously liquefied matrix components can be hardened out irreversibly to a duroplastic whereas the other of the previously liquefied matrix components remains meltable.

8 Claims, 1 Drawing Sheet

FIBER COMPOUND MATERIAL

BACKGROUND OF THE INVENTION

The invention relates to a fiber compound material comprising at least one fiber component and to a use of the fiber compound material.

Compound materials of this kind have fiber filaments and a matrix consisting of cross-linking or non cross-linking plastics.

In the manufacture of a compound material by means of a pressure impregnation the fiber filaments are immersed in the form of fiber strands in a bath with a dispersion consisting of water and polymer particles, with the material for a thermoplastic matrix being introduced between the fiber filaments with the particles. The particles distribute themselves in the fiber strands. The water which is taken up by the fiber strands is evaporated in a drying process. Then the polymer particles which are distributed in the fiber strands are melted, with the melt distributing itself uniformly in the fiber strands. A maximum wetting takes place between pair-wise arranged rollers, with a cooling down and a hardening of the matrix taking place at the same time.

In this material the low compression strength in the fiber direction and the poorer capability of adhesive bonding with other materials is considered disadvantageous.

SUMMARY OF THE INVENTION

The fiber compound material contains at least one fiber component and at least two matrix components of different material classes which have different thermo-mechanical properties. In a manufacture of the compound material, two matrix components can be liquefied and fiber filaments of the fiber component can be wetted by the liquefied matrix components. In this in the liquefied state the one matrix component is not soluble in the other. In a consolidation of the compound material one of the previously liquefied matrix components can be hardened out irreversibly to a duroplastic whereas the other of the previously liquefied matrix components remains meltable.

Uses of the fiber compound material as a preformed coating for a body having a shape are disclosed.

BRIEF DESCRIPTION OF THE DRAWING

In the following the invention will be explained with reference to the enclosed FIGURE. The sole FIGURE shows a section of an embodiment of a fiber compound material in accordance with the invention in a spatial illustration.

DESCRIPTION OF THE PREFERRED EMBODIMENTS

Figure 1:
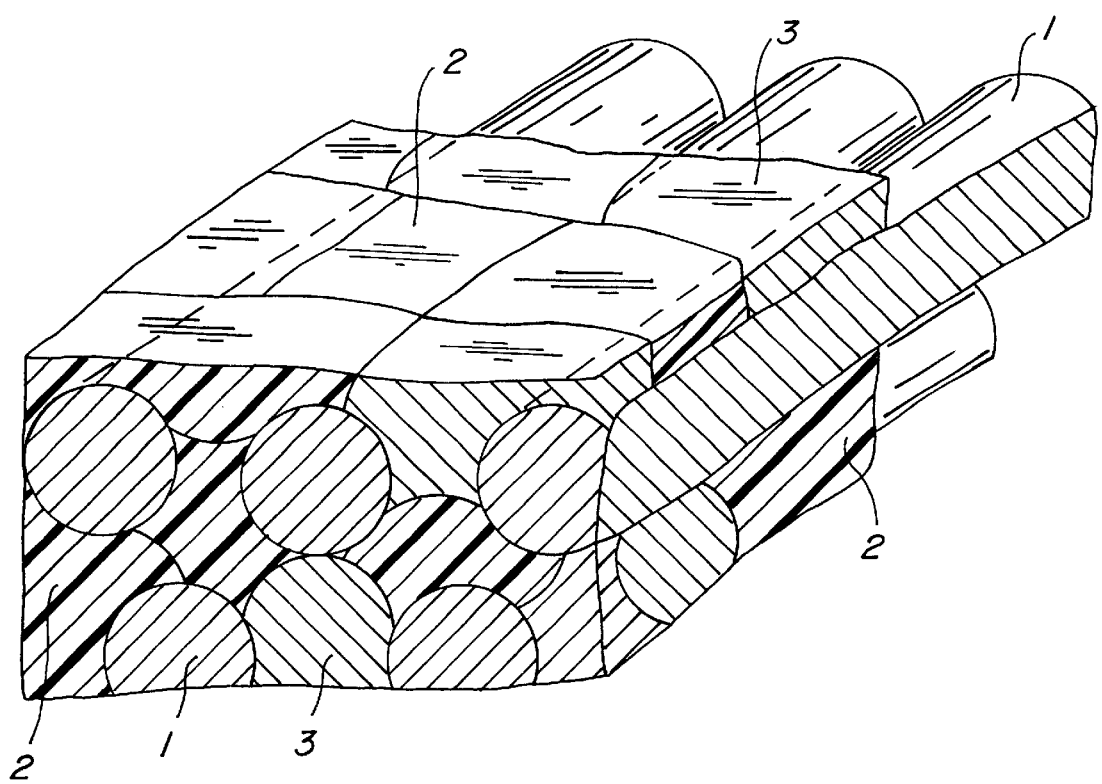

The fiber compound material is manufactured on the basis of the above-described manufacturing process from fiber strands which consist of fiber filaments 1, and of particles of a thermoplastic 2 and a duroplastic 3. In a preferred embodiment, fiber material consisting of carbon, particles of polyamide and particles of warm hardening epoxy resin are used. The fiber strands are impregnated in a bath with the particles of polyamide and epoxy resin, with it being possible for the proportion of the epoxy resin in relation to the plastic proportion to lie in the range from 3 to 30% by volume. In the impregnation the particles of polyamide and epoxy resin can also be worked into the fiber strands separately from one another. It is advantageous when a tenside is used for the reduction of the surface tension of the water. After the evaporation of the water the connection of the three components takes place in a downstream oven. Through the heating the particles of polyamide and epoxy resin are melted; the melts propagate in the fiber strands through the capillary action and wet the fiber filaments 1. The epoxy resin hardens out whereas the polyamide remains soft for the consolidation. In the consolidation the polyamide is solidified through cooling down.

As the FIGURE shows, a body is produced in which the thermoplastic particles 2 and the duroplastic particles 3 are connected with one another and with the fiber filaments 1; at the surface of the body there are regions which consist of thermoplastic and duroplastic. As a result of the regions of duroplastic the body can be connected with other bodies by means of adhesive bonding. As a result of the fact that the duroplastic also wets the fibers and has a higher elasticity module than the thermoplastic (for example polyamide), a higher compression strength is achieved in the fiber direction.

It is also possible after the melting to retain the liquid form of the matrix components, to press the latter and to cool down the liquid matrix components and to solidify at least one or both.

In a second embodiment of the fiber compound material, in addition to the fiber strands a first matrix component of thermoplastic, e.g. polyimide, and a second matrix component of metal, e.g. aluminum alloys, are used. The metallic alloy advantageously has a low melting point so that it can be melted during the manufacture of the compound material and during a later reshaping.

The compound material in accordance with the invention can also contain at least three matrix components, with the first matrix component being a thermoplastic, the second matrix component a duroplastic and the third a metal or another inorganic material.

The fiber components of the compound material in accordance with the invention can be present in the form of a fabric or mesh of fiber strands. A compound material of this kind can be formed to be semi-flexible. A semi-flexibility is present when the fiber strands which extend in a predetermined direction have a relatively small proportion of matrix components and this proportion is so small that the compound material is relatively easy to bend in the named direction at ambient temperature.

The compound material can be used to reinforce the surface of a body through adhesive bonding. In this an adhesive bonder is used for the adhesive bonding which enters into a substantially stronger bonding with one of the matrix components, in particular a duroplastic, than with another matrix component, in particular a thermoplastic. The compound material can be brought through thermoplastic deformation into a shape which fits onto the surface of the body prior to the adhesive bonding.

What is claimed is:
1. A fiber compound material comprising;
 fiber components in the form of an endless reinforcement strand of fiber filaments;
 first and second nonsoluble matrix components capable of wetting the fiber components when liquefied and having differing thermo-mechanical properties upon exposure to thermal energy, the first of the nonsoluble liquefied matrix components upon exposure to thermal energy hardening out irreversibly to a duroplastic and the second of the nonsoluble liquid matrix components upon exposure to thermal energy forming a meltable plastic; and, the first and the second nonsoluble liquefied matrix components exposed to thermal energy forming in a matrix about the fiber components under pressure conditions of impregnation.

2. The fiber compound material of claim 1 and wherein:

the second of the nonsoluble liquid matrix components forms a thermoplastic.

3. The fiber compound material of claim 1 and wherein:

the first of the nonsoluble liquefied matrix components hardens out irreversibly to a duroplastic lying in the range from 3 to 30% by volume of the total proportion of the matrix components.

4. The fiber compound material of claim 1 further including:

a third nonsoluble matrix component of a metallic alloy which upon exposure to the thermal energy can be melted.

5. The fiber compound material of claim 1 and wherein:

the fiber components in the form of an endless reinforcement strand of fiber filaments form a mesh of fiber strands.

6. The fiber compound material of claim 1 and wherein:

the fiber components are disposed in a predetermined direction; and, the nonsoluble matrix components have a reduced thickness with respect to the fiber components to enable the resulting fiber compound material to be bent at ambient temperature.

7. The fiber compound material of claim 1 and farther comprising:

a body; and, an adhesive for bonding the duroplastic of the fiber compound material to the body.

8. The fiber compound material of claim 1 and wherein:

the body has a shape; and, the fiber compound material is thermoplastically deformed.

* * * * *